US012722327B2

(12) United States Patent
Baillergeau et al.

(10) Patent No.: US 12,722,327 B2
(45) Date of Patent: Sep. 1, 2026

(54) MIXER

(71) Applicant: Saint-Gobain Placo, Courbevoie (FR)

(72) Inventors: Matthieu Baillergeau, Aubervilliers (FR); Abderahim Ryadi, Aubervilliers (FR); Andrea Ranzani da Costa, Courbevoie (FR); Hamouda Jaffel, Courbevoie (FR)

(73) Assignee: Saint-Gobain Placo, Courbevoie (FR)

( * ) Notice: Subject to any disclaimer, the term of this patent is extended or adjusted under 35 U.S.C. 154(b) by 0 days.

(21) Appl. No.: 19/114,384

(22) PCT Filed: Dec. 6, 2023

(86) PCT No.: PCT/EP2023/084633
§ 371 (c)(1),
(2) Date: Mar. 21, 2025

(87) PCT Pub. No.: WO2024/126235
PCT Pub. Date: Jun. 20, 2024

(65) Prior Publication Data

US 2026/0124786 A1 May 7, 2026

(30) Foreign Application Priority Data

Dec. 13, 2022 (EP) .................................... 22306865

(51) Int. Cl.
*B28C 7/02* (2006.01)
*B01F 23/50* (2022.01)
(Continued)

(52) U.S. Cl.
CPC ............ *B28C 7/024* (2013.01); *B01F 23/565* (2022.01); *B01F 23/581* (2022.01); *B01F 23/59* (2022.01);
(Continued)

(58) Field of Classification Search
CPC ... B28C 7/024; B28C 7/10; B28C 5/16; B01F 23/565; B01F 23/581; B01F 23/59;
(Continued)

(56) References Cited

U.S. PATENT DOCUMENTS 10,695,950 B2 * 6/2020 Igo ............................ B28C 7/02
11,801,616 B2 * 10/2023 Martinez ................. B01F 35/00
(Continued)

FOREIGN PATENT DOCUMENTS

CN 108380093 A 8/2018
KR 20190050509 A 5/2019

OTHER PUBLICATIONS

International Search Report and Written Opinion of the International Search Authority issued in International Application PCT/EP2023/084633, mailed Mar. 19, 2025, 15 pages.

*Primary Examiner* — Minh Q Le
(74) *Attorney, Agent, or Firm* — McDonnell Boehnen Hulbert & Berghoff LLP

(57) ABSTRACT

A mixer and a method for the mixing of a cementitious slurry, configured to calculate the volume of the cementitious slurry in the mixer in order to produce an improved mixing process and/or an improved cementitious product. The mixer comprises a sensor to measure a parameter of the slurry in the mixer that is used to calculate the volume of slurry in the mixer.

14 Claims, 2 Drawing Sheets

(51) Int. Cl.

| | |
|---|---|
| *B01F 23/60* | (2022.01) |
| *B01F 35/20* | (2022.01) |
| *B01F 35/21* | (2022.01) |
| *B01F 35/213* | (2022.01) |
| *B01F 35/221* | (2022.01) |
| *B01F 101/28* | (2022.01) |
| *B28C 5/16* | (2006.01) |
| *B28C 7/10* | (2006.01) |

(52) U.S. Cl.
CPC ............... *B01F 23/69* (2022.01); *B01F 35/20* (2022.01); *B01F 35/21* (2022.01); *B01F 35/211* (2022.01); *B01F 35/2115* (2022.01); *B01F 35/21151* (2022.01); *B01F 35/213* (2022.01); *B01F 35/221* (2022.01); *B01F 2101/28* (2022.01); *B01F 2215/0413* (2013.01); *B28C 5/16* (2013.01); *B28C 7/10* (2013.01)

(58) Field of Classification Search
CPC .......... B01F 23/69; B01F 35/20; B01F 35/21; B01F 35/211; B01F 35/2115; B01F 35/21151; B01F 35/213; B01F 35/221; B01F 2101/28; B01F 2215/0413
USPC ................................ 137/2; 73/64.43, 864.71
See application file for complete search history.

(56) References Cited

U.S. PATENT DOCUMENTS

| | | | | |
|---|---|---|---|---|
| 2008/0101151 | A1 | 5/2008 | Frank et al. | |
| 2008/0310247 | A1* | 12/2008 | Basaraba | B28C 7/0481 366/8 |
| 2009/0037026 | A1 | 2/2009 | Sostaric et al. | |
| 2010/0061178 | A1* | 3/2010 | Miyazato | B01F 35/213 366/100 |
| 2014/0355372 | A1* | 12/2014 | Black | B01F 35/881 366/8 |
| 2015/0170929 | A1* | 6/2015 | Chiang | B01F 23/551 156/345.12 |
| 2015/0355160 | A1* | 12/2015 | Berman | G01N 27/048 73/54.03 |
| 2017/0016874 | A1* | 1/2017 | Radjy | B28C 7/024 |
| 2021/0148883 | A1* | 5/2021 | Hinzmann | G01F 1/34 |
| 2022/0234249 | A1* | 7/2022 | Papania-Davis | B28C 7/0418 |
| 2022/0274287 | A1* | 9/2022 | Rößler | B28C 5/16 |
| 2023/0191347 | A1* | 6/2023 | Reichel | B01F 35/7162 366/101 |
| 2025/0058291 | A1* | 2/2025 | Kim | B01F 35/221 |

* cited by examiner

MIXER

CROSS-REFERENCE TO RELATED APPLICATIONS

This application is a U.S. national phase application of International Patent Application no. PCT/EP2023/084633, filed Dec. 6, 2023, which claims priority to European Patent Application no. 22306865.1, filed Dec. 13, 2022.

FIELD OF THE DISCLOSURE

The present disclosure relates generally to mixers and processes for the mixing, monitoring, and dispensing of cementitious slurries.

BACKGROUND

During cementitious board manufacture, a cementitious slurry is mixed within and dispensed from a mixer. If the volume of slurry in the mixer is too large or too small, these deviations in volume can result in problems with the manufacturing process and/or the cementitious board product itself. For example, where the volume of slurry in the mixer diverges from what is expected, the slurry may include lumps and/or the cementitious product may include unwanted voids.

Generally slurry mixers comprise mixing members that mix the slurry. Additionally, slurry mixers may comprise scrapers that clean deposited slurry from the walls of the mixer. Slurry mixers are therefore poorly accessible and, therefore, it can be challenging to monitor the volume of slurry within.

Current methods for controlling and/or monitoring the slurry volume fraction within a mixer use estimations based on ideal mixers with no stagnant zones or short circuits. In reality, mixers are not ideal, and it would be useful to monitor the actual mixer volume and slurry volume fraction. With this in mind, pigments can be added to the slurry and a camera used to calculate the concentration of the pigment within the slurry and estimate the slurry volume fraction. However, this method contaminates the slurry with pigment and cannot be applied continuously. Additionally, any contact between the slurry and sensitive equipment within the mixer can damage that equipment. As such, current methods whether based on theoretical calculations of mean residence time or more physical approaches cannot provide a continuous and reliable measurement of the slurry volume fraction within a mixer.

Aspects of the present disclosure seek to provide mixers and mixing processes that alleviate these problems with prior known systems. In particular, aspects of the present disclosure seek to provide improved mixers and mixing processes able to monitor the volume of slurry in the mixer.

SUMMARY

According to a first aspect of the present disclosure, there is provided a mixer for the mixing of a cementitious slurry, the mixer comprising: an inlet for receiving a cementitious material and water; a mixing member configured to mix the cementitious material and water to form a cementitious slurry; an outlet for dispensing the cementitious slurry; a sensor configured to measure a parameter of the cementitious slurry; and a processor configured to use the parameter measurement to calculate a volume of the cementitious slurry in the mixer.

In this way, the mixer allows the volume of the slurry in the mixer to be monitored without polluting the slurry in order to avoid issues with the process and product.

In some embodiments, the processor is further configured to calculate a slurry volume fraction of the mixer wherein the slurry volume fraction is defined according to the following formula:

$$\text{Slurry volume fraction} = \frac{\text{Volume of slurry in the mixer}}{\text{Total volume of the mixer}}$$

In this way, the slurry volume fraction can be used to determine an improved mixer size and geometry for different line speeds to optimise the slurry volume fraction to avoid issues with the process and product. Additionally, calculating the slurry volume fraction allows for a simpler comparison and adjustment for mixers of different sizes.

In some embodiments, the processor is further configured to change at least one of an input parameter, a process parameter, and an output parameter of the mixer in response to the calculated volume of cementitious slurry in the mixer and/or the slurry volume fraction of the mixer. In this way, the volume of slurry in the mixer can be adjusted to improve the process and product. For example, if the volume of slurry is higher than desired, the rate input of slurry components into the mixer may be reduced or the rate of output of slurry from the mixer may be increased. If the volume of slurry is lower than desired, the rate of slurry components input into the mixer may be increased or the rate of slurry output from the mixer may be decreased. In some embodiments, the input parameter is selected from the list consisting of: the line speed, rate of input of slurry components into the mixer, input volumetric flow rate (e.g. the volume of materials entering in mixer per second), input temperature (e.g. the temperature of one or more materials entering the mixer), or the composition of the slurry. In some embodiments, the process parameter is the mixing speed (e.g. the speed of one or more mixing members within the mixer) or the mixing temperature (e.g. the temperature of the slurry within the mixer). In some embodiments, the output parameter is selected from the list consisting of: the line speed, mixer output speed (e.g. the speed of material exiting the mixer), output volumetric flow rate (e.g. the volume of material leaving the mixer per second), output temperature (e.g. the temperature of the slurry leaving the mixer), the outlet cross-section.

In some embodiments, the mixer comprises a base and a lid wherein the base and the lid are connected by at least one side wall. In some embodiments, the mixer is a closed system. In this way, the conditions in the mixer can be more easily controlled.

In some embodiments, the mixer comprises a scraper configured to remove deposited slurry from the walls of the mixer. In this way, the risk of parts of the slurry setting on the walls of the mixer is reduced and the consistency of the slurry is improved.

In some embodiments, the sensor comprises an infrared camera. In this way, the infrared camera (IR camera hereafter), can provide a direct visualisation of the profile of the slurry in the mixer. The position of the slurry in the mixer can also be determined. The combination of the profile and the position allows a direct visualisation and/or estimation of the slurry volume occupied in the mixer.

In some embodiments, the mixer comprises an IR window configured to allow the transmission of infrared radiation from the cementitious slurry inside the mixer to the IR camera outside. In this way, the IR camera is able to visualise the slurry in the mixer through the IR window without the need for an IR camera in the mixer itself. Including a camera inside the mixer could pollute the slurry and be very susceptible to damage from at least the abrasive slurry. In this way, the infrared camera can be used to calculate the volume of slurry in the mixer without coming into contact with the slurry. Separating the sensor and the slurry protects the camera from damage caused by the abrasive slurry and harsh conditions within the mixer. Additionally, separating the sensor and the slurry protects the slurry from contamination from the sensor.

In some embodiments the IR window is located on the lid of the mixer. In alternative embodiments, the IR window is located on the base of the mixer.

In some embodiments, the IR window comprises a ceramic. In some embodiments, the IR window comprises zinc sulfide. In this way, the IR window is suited to the harsh industrial environment. In some embodiments, the IR window consists of zinc sulfide.

In some embodiments, the infrared camera is mounted on a camera holder. In some embodiments, the camera holder is configured to be moved by the user. In this way, the user can move the camera holder and IR sensor to optimise the field of view to optimise the measurements. In some embodiments, the camera holder is attached to the mixer. In this way, the camera has a constant view of the slurry, which allows for consistent analysis of the slurry.

In some embodiments, the sensor may comprise at least one thermocouple. In this way, the temperature of the slurry, and its presence or absence at a point within the mixer, can be determined. In some embodiments, the mixer comprises at least one hole to accommodate the at least one thermocouple.

In some embodiments, an array of thermocouples may be used. Where an array of thermocouples is used, these can provide a direct measurement of the profile of the slurry in the mixer. The position of the slurry in the mixer can also be determined. The combination of the profile and the position allows a direct visualisation and/or estimation of the slurry volume occupied in the mixer In some embodiments, the sensor may comprise an IR camera and at least one thermocouple. In this way, both the IR camera and the at least one thermocouple may be used to monitor the volume of slurry in the mixer in order to more accurately determine the volume of slurry in the mixer.

In some embodiments, the mixer is configured to measure the parameter of the slurry substantially continuously. In this way, the volume of slurry in the mixer and/or the slurry volume fraction can be monitored continuously with no need to interrupt the mixing process to carry out measurements. Additionally, the volume of slurry in the mixer and/or the slurry volume fraction is related to the Mean Residence Time (MRT) of the slurry in the mixer. The MRT is an important parameter to consider to avoid the risk of lumps in the slurry. Gypsum slurry used in cementitious board production has a fast initial setting time, often less than 50 seconds, and therefore the formation of lumps can be a significant issue in cementitious board production. The MRT is also an important parameter in the assessment of whether or not the water gauge of the slurry is too high. If the water gauge is too high, it can lead to high levels of disintegration in the mixer that can lead to issues with the process and the product. As such, the continuous measurement of the volume of slurry in the mixer and/or the slurry volume fraction may allow for the continuous calculation of the MRT.

In some embodiments, the cementitious material added to the mixer is calcium sulphate hemihydrate. In this way, the mixer may be used to mix a calcium sulphate hemihydrate slurry in plasterboard production.

According to a second aspect of the present disclosure, there is provided a process for the manufacture of a cementitious board, the process comprising: forming a slurry of water and cementitious material; mixing the slurry in a mixer; measuring a parameter of the slurry in the mixer and calculating a volume of the slurry in the mixer; depositing the slurry to form a board precursor; and drying the board precursor to form a cementitious board. In this way, the volume of slurry in the mixer can be monitored in order to provide an improved production method and product.

In some embodiments, the process further comprises calculating a slurry volume fraction from the slurry volume, wherein the slurry volume fraction is defined according to the following formula:

$$\text{Slurry volume fraction} = \frac{\text{Volume of slurry in the mixer}}{\text{Total volume of the mixer}}$$

In this way, the slurry volume fraction can be used to determine an improved mixer size and geometry for different line speeds to optimise the slurry volume fraction to avoid issues with the process and product. Additionally, calculating the slurry volume fraction allows for a simpler comparison and adjustment for mixers of different sizes.

In some embodiments, the process further comprises changing at least one of an input parameter, a process parameter, and an output parameter in response to the calculated volume and/or slurry volume fraction. In this way, the volume of slurry in the mixer can be adjusted to improve the process and product. For example, if the volume of slurry is higher than desired, the rate input of slurry components into the mixer may be reduced or the rate of output of slurry from the mixer may be increased. If the volume of slurry is lower than desired, the rate of slurry component input into the mixer may be increased or the rate of slurry output from the mixer may be decreased. In some embodiments, the input parameter is selected from the list consisting of: the line speed, rate of input of slurry components into the mixer, input volumetric flow rate (e.g. the volume of materials entering in mixer per second), input temperature (i.e. the temperature of one or more materials entering the mixer), or the composition of the slurry. In some embodiments, the process parameter is the mixing speed (e.g. the speed of one or more mixing members within the mixer) or the mixing temperature (e.g. the temperature of the slurry within the mixer). In some embodiments, the output parameter is selected from the list consisting of: the line speed, mixer output speed (e.g. the speed of material exiting the mixer), output volumetric flow rate (e.g. the volume of material leaving the mixer per second), output temperature (e.g. the temperature of the slurry leaving the mixer), the outlet cross-section.

In some embodiments, the measurement of the parameter of the slurry is substantially continuous. In this way, the volume of slurry in the mixer and/or the slurry volume fraction can be monitored continuously with no need to interrupt the mixing process to carry out measurements. Additionally, continuous measurement allows for estimation of the Mean Resident Time (MRT) of the slurry in the mixer. The MRT is an important parameter to consider to avoid the risk of lumps in the slurry. Gypsum slurry used in cementitious board production has a fast initial setting time, often less than 50 seconds, and therefore the formation of lumps can be a significant issue in cementitious board production. The MRT is also an important parameter in the assessment of the water gauge of the slurry is too high. If the water gauge is too high, it can lead to high levels of disintegration in the mixer that can lead to issues with the process and the product.

In some embodiments, the process further comprises changing the composition of the cementitious slurry in response to the calculated volume of slurry in the mixer. In this way, the composition of the slurry can be adjusted to adapt to the volume of the slurry in the mixer in order to reduce problems with the process and the product. Therefore providing an improved mixing process and cementitious board product. For example, the amount of fluidiser used in the slurry may be increased or decreased to reduce the risk of lumps in the slurry or unwanted voids in the cementitious board.

In some embodiments, the cementitious material is calcium sulphate hemihydrate. In this way, the method may be used to mix a calcium sulphate hemihydrate slurry in plasterboard production.

BRIEF DESCRIPTION OF THE DRAWINGS

The disclosure will be further described with reference to examples depicted in the accompanying figures in which.

DETAILED DESCRIPTION

Figure 1:
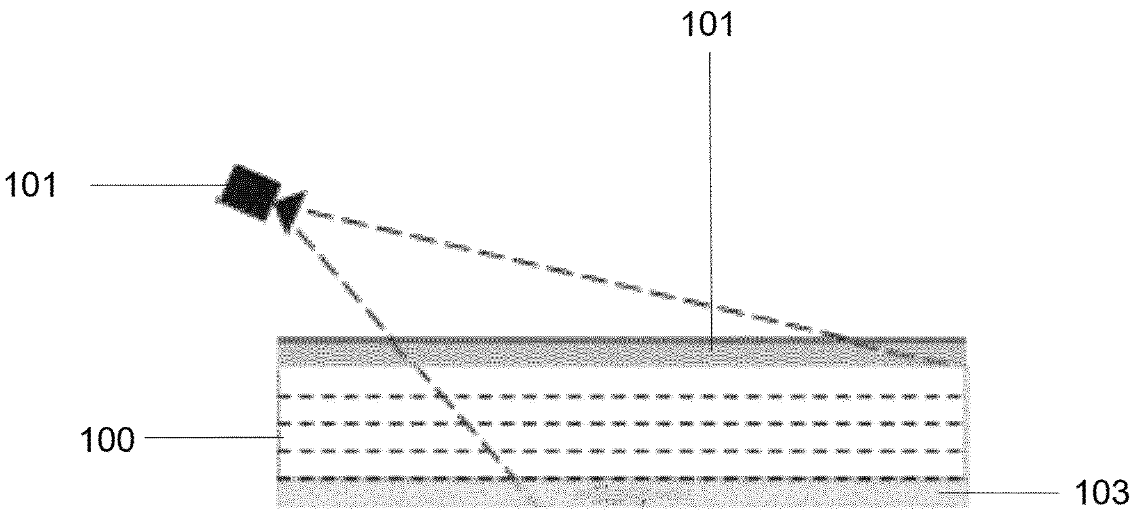
FIG. 1 is a diagram of an infrared camera system of an embodiment of a mixer of the present invention.

The following description presents particular examples and, together with the drawings, serves to explain principles of the disclosure. However, the scope of the invention is not intended to be limited to the precise details of the examples, since variations will be apparent to a skilled person and are deemed to be covered by the description. Terms for components used herein should be given a broad interpretation that also encompasses equivalent functions and features. In some cases, alternative terms for structural features may be provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "top", "bottom", "upper" and "lower" are used for convenience of explanation usually with reference to the illustrations and are not intended to be ultimately limiting if an equivalent function can be achieved with an alternative dimension, orientation and/or direction.

The description herein refers to examples with particular combinations of features, however, it is envisaged that further combinations and cross-combinations of compatible features between embodiments will be possible. Indeed, isolated features may function independently as an invention from other features and not necessarily require implementation as a complete combination.

In an embodiment of the invention, a mixer comprises an IR camera mounted on a camera holder attached to the mixer. The mixer comprises a lid, a base and at least one side wall connecting the lid and the base. The mixer further comprises a IR window on the lid of the mixer. The IR window is configured to allow the transmission of infrared radiation from the slurry inside the mixer to the IR camera outside. The IR window comprises zinc sulphide and has a thickness of 5 mm. The camera holder is movable to allow the user to position the IR camera to optimise the field of view through the IR window. The IR window is located 4 cm from the side of the internal casing wall of the mixer.

Cementitious material, water, additives and other materials are added into the mixer to form a slurry. The cementitious material is hot when added and the hydration of the cementitious material is exothermic. Accordingly, the volume of slurry in the mixer can be determined using IR imaging due to the higher temperature of the slurry. As the slurry is mixed in the mixer, the slurry is pushed to the edges of the mixer due to the centrifugal force. The slurry forms a donut shape and the thickness of the donut shape can be characterised with IR imaging. To observe the slope of the donut, the IR window requires a field of view of at least 10 cm. The IR camera is positioned at an angle such there is an angle, α, between the field of view of the camera, β, and the perpendicular height of the camera, γ, to avoid reflection of the camera in the IR window. The distance between the 10 cm view and the base of the camera holder is defined as δ. The field of view of the camera, β, is determined using the following formula:

$$\beta = \arctan\left(\frac{\delta + 10}{\gamma}\right) - \arctan\left(\frac{\delta}{\gamma}\right)$$

The orientation of the camera, ϕ, is determined using the following formula:

$$\varphi = \alpha + \frac{\beta}{2} = \arctan\left(\frac{\delta + 10}{\gamma}\right) + \frac{1}{2}\arctan\left(\frac{\delta}{\gamma}\right)$$

The IR images may be analysed to determine the position of the decreasing profile of the slurry and then the volume of slurry in the mixer.

As an alternative to in IR camera and window, the mixer comprises thermocouples and holes to accommodate the thermocouples in order to capture the heat profile of the slurry.

FIG. 1 is a schematic diagram of an IR system of an embodiment of the present invention. FIG. 1 illustrates the field of view of the IR camera 101 through the IR window 102 to the slurry 103 in the mixer 100.

Figure 2:
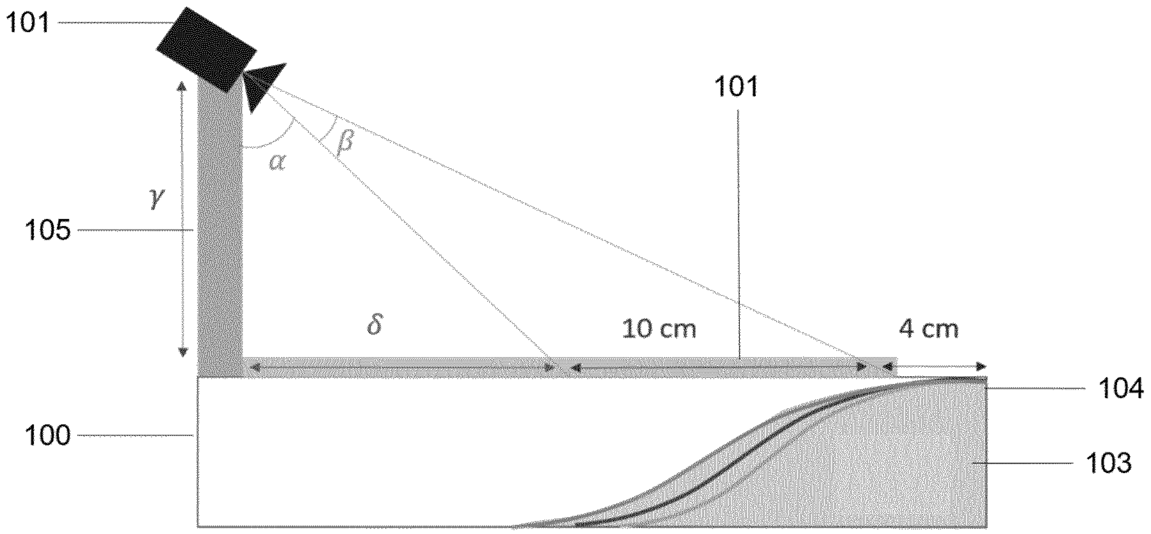
FIG. 2 is a diagram of an infrared camera system of an embodiment of a mixer of the present invention.
Figure 3:
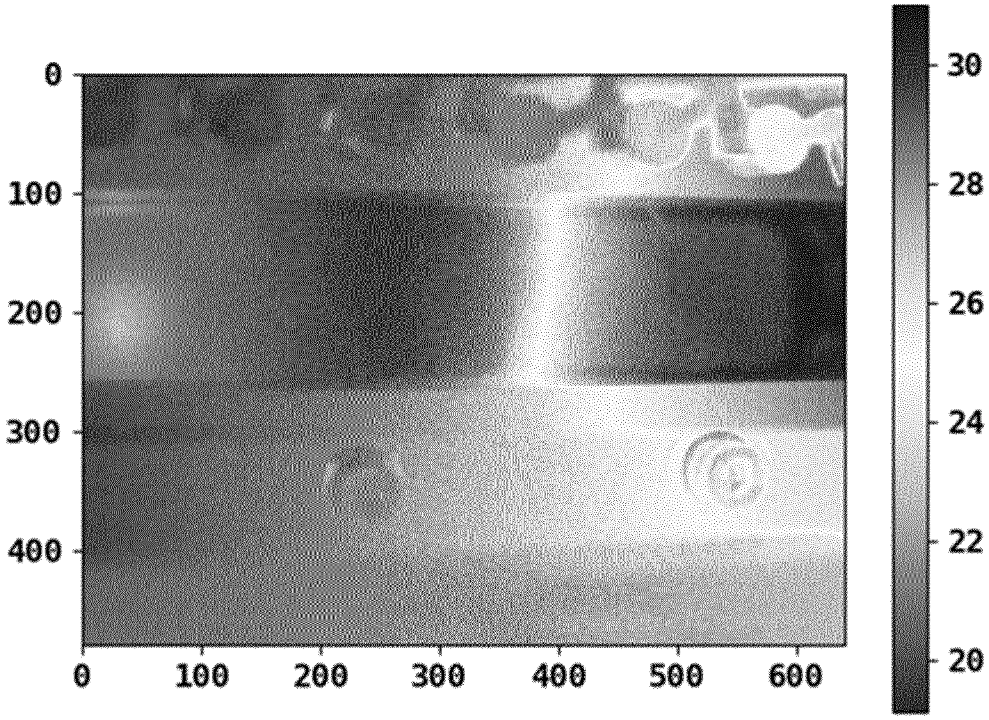
FIG. 3 is an image taken by an IR camera in an embodiment of the present invention.

FIG. 2 is a schematic diagram of an IR system of an embodiment of the present invention. The IR camera 101 receives infrared radiation through the IR window 102 from the cementitious slurry 103. The IR window 102 is located 4 cm from the inner side wall 104 of the mixer 100. The IR camera 101 is mounted on a camera holder 105 attached to the mixer 100.

Figure 4:
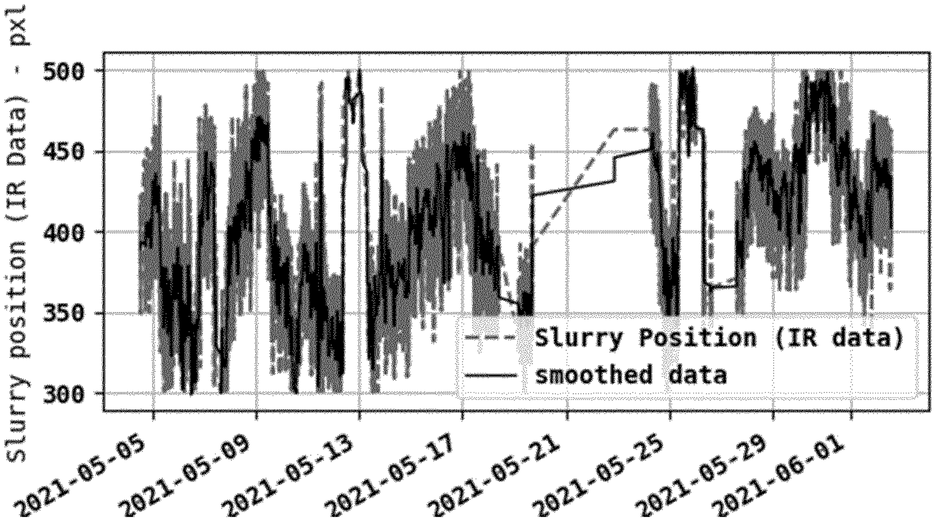
FIG. 4 is a graph showing the relationship between the position of the slurry and time as measured by an IR camera of an embodiment of the present invention.

FIG. 4 illustrates the relationship between the slurry position and time as measured by the IR camera. The observed variations are linked to changes in the slurry volume fraction of the mixer.

The invention claimed is:

1. A mixer for the mixing of a cementitious slurry, the mixer comprising:

an inlet for receiving a cementitious material and water;
a mixing member configured to mix the cementitious material and water to form a cementitious slurry;
an outlet for dispensing the cementitious slurry;
a sensor configured to measure a parameter of the cementitious slurry; and
a processor configured to use the parameter measurement to calculate a volume of the cementitious slurry in the mixer;

wherein the sensor comprises an array of thermocouples; or
the sensor comprises an infrared camera, and the mixer comprises an IR window configured to allow the transmission of infrared radiation from the cementitious slurry inside the mixer to the IR camera outside.

2. The mixer of claim 1, wherein the sensor comprises the array of thermocouples.

3. The mixer of claim 1, wherein the sensor comprises the infrared camera and the mixer comprises the IR window configured to allow the transmission of infrared radiation from the cementitious slurry inside the mixer to the IR camera outside.

4. The mixer of claim 1, wherein the processor is further configured to calculate a slurry volume fraction of the mixer wherein the slurry volume fraction is defined according to the following formula:

$$\text{Slurry volume fraction} = \frac{\text{Volume of slurry in the mixer}}{\text{Total volume of the mixer}}.$$

5. The mixer of claim 1, wherein the processor is further configured to change at least one of an input parameter, a process parameter, and an output parameter of the mixer in response to the calculated volume of cementitious slurry in the mixer and/or the slurry volume fraction of the mixer.

6. The mixer of claim 1, wherein the input parameter is selected from the list consisting of: a line speed, an input speed, an input volumetric flow rate, an input temperature or the composition of the slurry.

7. The mixer of claim 1, wherein the process parameter is a mixing speed or a mixing temperature.

8. The mixer of claim 1, wherein the output parameter is selected from the list consisting of: a mixer output speed, an output volume, an output temperature or an outlet cross-section.

9. A process for the manufacture of a cementitious board, the process comprising:

forming a slurry of water and cementitious material;
mixing the slurry in a mixer;
measuring a parameter of the slurry in the mixer using a sensor and calculating a volume of the slurry in the mixer using the measured parameter;
depositing the slurry to form a board precursor; and
drying the board precursor to form a cementitious board;

wherein the sensor comprises an array of thermocouples; or
the sensor comprises an infrared camera, and the mixer comprises an IR window configured to allow the transmission of infrared radiation from the cementitious slurry inside the mixer to the IR camera outside.

10. The process of claim 9, wherein the sensor comprises the array of thermocouples.

11. The process of claim 9, wherein the sensor comprises the infrared camera, and the mixer comprises the IR window configured to allow the transmission of infrared radiation from the cementitious slurry inside the mixer to the IR camera outside.

12. The process of claim 9, wherein the process further comprises calculating a slurry volume fraction from the slurry volume, wherein the slurry volume fraction is defined according to the following formula:

$$\text{Slurry volume fraction} = \frac{\text{Volume of slurry in the mixer}}{\text{Total volume of the mixer}}.$$

13. The process of claim 9, wherein the process further comprises changing at least one of an input parameter, a process parameter, and an output parameter in response to the calculated volume and/or slurry volume fraction.

14. The process of claim 9, wherein the measurement of the parameter of the slurry is substantially continuous.

* * * * *